July 29, 1952    J. E. KLINE    2,604,735
METHOD AND MEANS FOR FINISHING ANNULAR GROOVES
Filed March 5, 1949    3 Sheets-Sheet 1
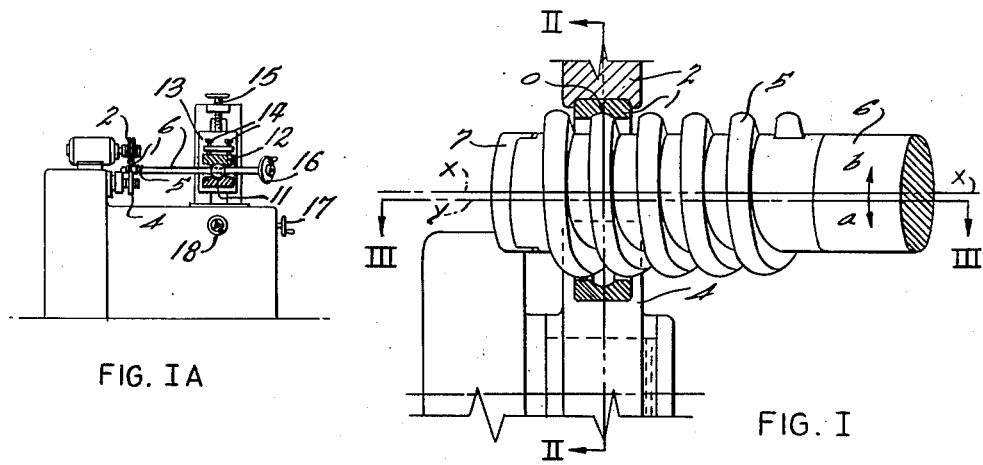
FIG. IA    FIG. I
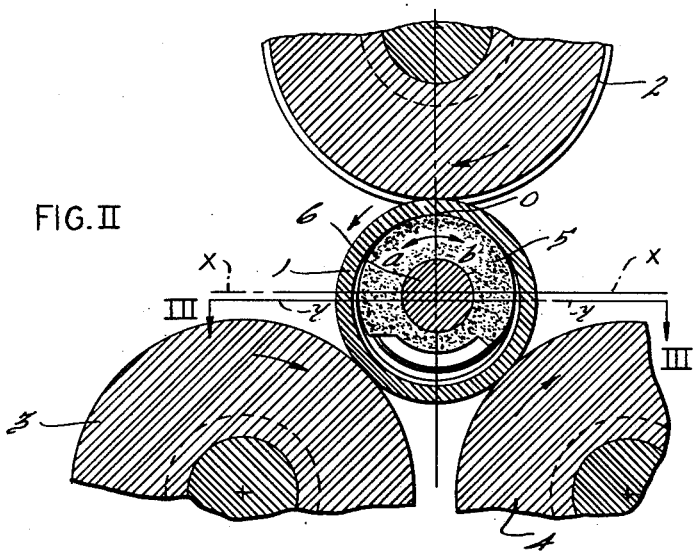
FIG. II
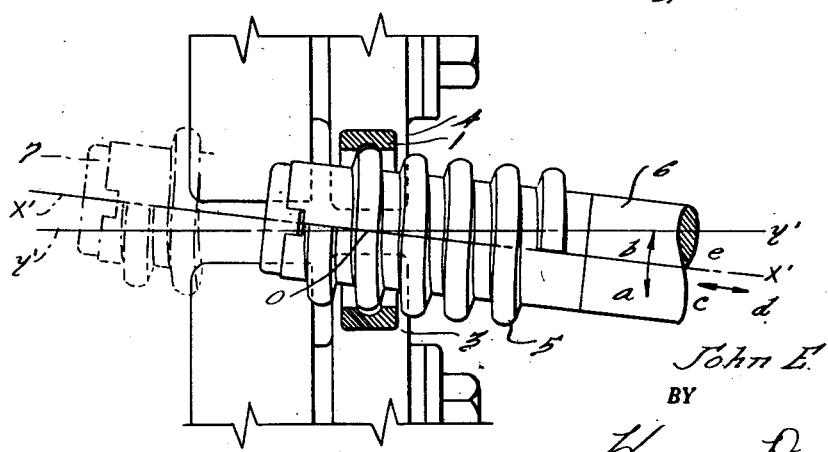
FIG. III
INVENTOR.
John E. Kline.
BY
Harness, Dickey & Pierce
ATTORNEYS.

July 29, 1952     J. E. KLINE     2,604,735
METHOD AND MEANS FOR FINISHING ANNULAR GROOVES
Filed March 5, 1949     3 Sheets-Sheet 2
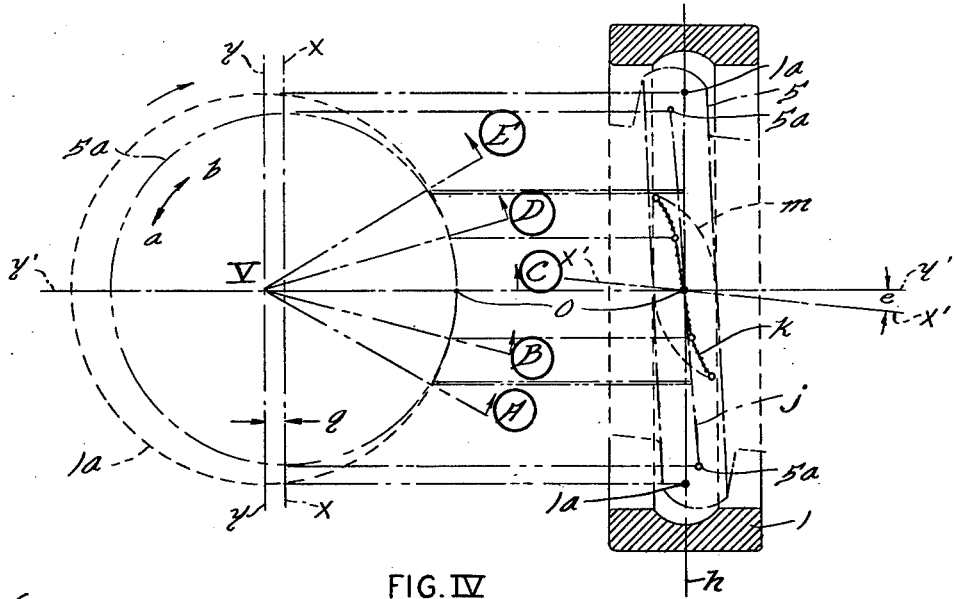
FIG. IV
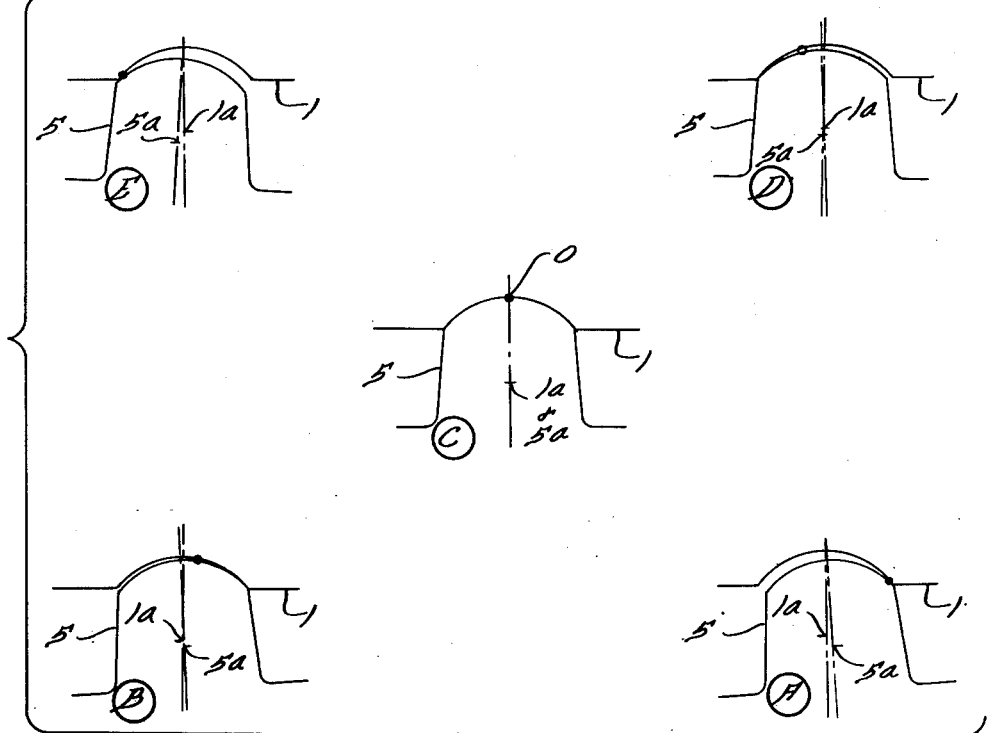
FIG. V
INVENTOR.
John E. Kline.
BY
Barnes, Dickey & Pierce
ATTORNEYS.

July 29, 1952 — J. E. KLINE — 2,604,735
METHOD AND MEANS FOR FINISHING ANNULAR GROOVES
Filed March 5, 1949 — 3 Sheets-Sheet 3
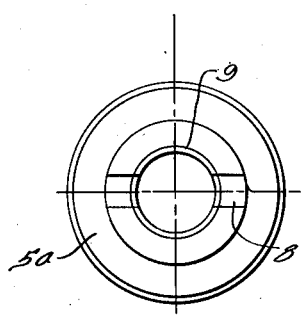
FIG. VI-A
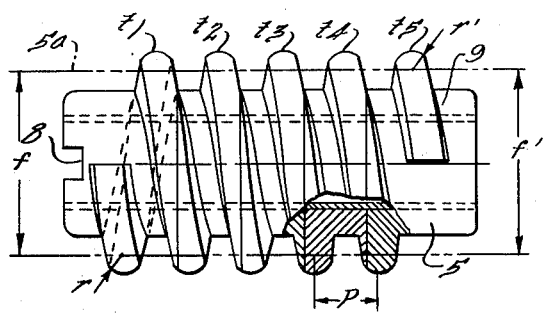
FIG. VI
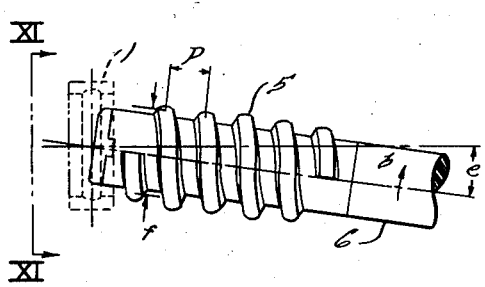
FIG. VII
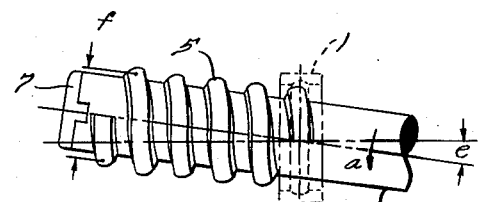
FIG. VIII
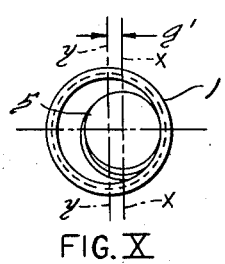
FIG. X
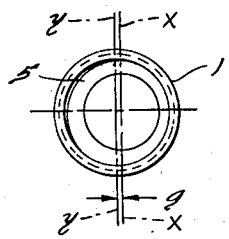
FIG. XI
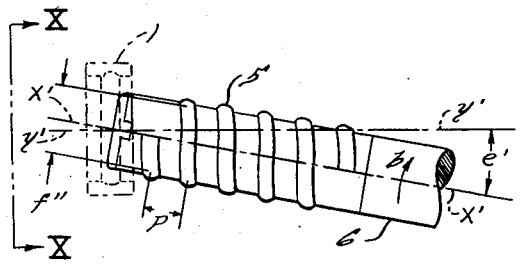
FIG. IX
INVENTOR.
John E. Kline.
BY
Harness, Dickey & Pierce.
ATTORNEYS Patented July 29, 1952

2,604,735

UNITED STATES PATENT OFFICE 2,604,735

METHOD AND MEANS FOR FINISHING ANNULAR GROOVES

John E. Kline, Grosse Pointe Farms, Mich., assignor to Micromatic Hone Corporation, Detroit, Mich., a corporation of Michigan Application March 5, 1949, Serial No. 79,854

11 Claims. (Cl. 51—48)

This invention generally relates to a new and improved method of, and means for, finishing the grooves in outer races of anti-friction bearings, otherwise known as bearing "cups." These cups consist of a hollow cylinder or ring in the inner surface of which is provided one or more annularly disposed grooves constituting the track over which the balls or contoured rollers of the unit travel when the bearing is in operation.

Because of the high speeds at which these rollers or balls traverse the raceways and the heavy radial or thrust loads they are frequently required to carry, it is requisite that the raceways, as well as the balls or rollers, be geometrically precise and smoothly surfaced to insure low-frictional values, quietness, and a consequently long life for the bearing. The materials of which these bearing components are made are invariably hardened and therefore require the use of abrading operations in their manufacture in order to produce a degree of geometric accuracy in their dimensions such as to make the functional values of anti-friction bearings commensurate with their increased cost over those of sleeve, or oil-film bearings. Currently used abrading operations generally consist of plunge-grinding the raceways of cup and cone members. Sometimes oscillating grinders are used to generate the grooves in the latter; but in any case, it being an external operation, the fact that fairly large diameter-formed wheels may be used to grind the grooves in the "cone" member presents a great advantage toward the production of correctly contoured, true circled raceways in this component.

In the case of the "cup" raceway, however, the size of the grinding wheel which may be used is limited by the diameter of the bore which it must enter. The rapid wear of a wheel of such small periphery makes the maintenance of form on the wheel a ponderable problem and results in inaccuracies in contour of the groove produced. Further, so small a wheel must of necessity be mounted on a quill of small dimension, with inadequate stability to withstand the radial and tangential cutting forces set up between the wheel and the work surface during operation. Added to this are the clearances of motion between the wheel spindle and its bearings and the work-holding spindle and its bearings, which also contribute to deficiencies in the results desired of the operation; namely, a properly contoured, precisely-circular and a smoothly-surfaced groove. Instead, the grooves so produced are wavy, chatter-marked, scratch-pitted, and inconsistent in shape.

Numerous means have been devised to stone, polish, or lap these grooves after grinding to enhance the performance of the bearings which would otherwise result. It has been shown that "smoothing" the track surface reduces friction and noise in the bearing when operated at low speeds and loads; and that noisiness and frictional heat, symptoms of deterioration in the bearing, increase as the speeds and loads are increased. At these higher speeds and loads, the deleterious effect of annular (macrogeometric) "waviness" becomes increasingly apparent despite any degree of (microgeometric) "smoothing" that might have been accomplished on the raceway. It is, therefore, evident that optimum performance in such bearings depends upon the degree of both the microgeometric and macrogeometric perfection achieved in the generation of the bearing raceways.

The method and means for achieving this desired perfection in the raceway of the cone member is covered in the copending patent application of Peter H. Wayne, Serial No. 57,538, filed October 30, 1948, and assigned to the assignee of the subject invention.

The principal object of the subject invention is to provide a new and improved method and means adapted to the finishing of raceways of "cup" members with a superiority in microgeometric and macrogeometric characteristics over those of current methods.

Another object of this invention is to provide a new and improved method of, and apparatus for, removing annular waviness resulting from the deficiencies of previous machining operations on the raceways of bearing cups.

A third object is to provide a new and improved method and means for correcting errors in the transverse contours of grooves of bearing cups and to make them of uniform shape throughout the periphery of the raceway.

Another object is to provide a new and improved method and means for finish-abrading the grooves of anti-friction bearing cups wherein the effective abrading area of the tool used is materially greater than the area of the groove to be finished.

Another object is to provide a new and improved method for honing or lapping the grooves of anti-friction bearing cups in which a combination of rotary motions are used to generate a circular annulus.

Another object is to provide a new means for honing or lapping arcuate surfaces in which the abrading surface of the hone or lap is so considerably greater than the arcuate surface abraded thereby that it is thus capable of retaining its proper shape while removing improprieties in the shape of the arcuate surface.

Another object is to provide a new and improved method and means for efficiently combining the use of relatively coarse and fine abrasives in a progressive manner to generate a correct contour in an arcuate surface and thereafter impart an extremely smooth surface thereto in a single operation.

Another object is to provide a new and improved method and means for honing or lapping wherein the change in size of the piece being abraded is compensated for by a comparable change in size of the abrading means so as to maintain them in continguous contact throughout their operation upon each other.

Another object is to provide a new and improved method of and means for correcting and finishing the grooves of bearing cups whereby they may be produced more accurately, smoother and more efficiently than at present.

Other objects and advantages of the invention will become readily apparent upon reference to the following specification and the accompanying drawings, wherein:

Fig. I is a view in side elevation of a honing tool in a workpiece shown in section, showing the workpiece or bearing cup in cross-section.

Fig. I-A is a view in elevation of a machine for operating the tool of Fig. I;

Fig. II is a sectional view of Fig. I, taken on the line II—II thereof;

Fig. III is a sectional view of Figs. I and II, taken on the lines III—III thereof.

Fig. IV shows an enlarged cross section of a typical workpiece through its horizontal plane within the bore of which is superposed a single thread element of the hone or lap, and a geometric projection of the relative positions of the base circles of the workpiece groove and the thread of the hone or lap in relative operating positions.

Figs. V-A, through V-E, depict the relative change in position of the medials of contact between the workpiece groove and working face of the thread on the abrading element, as taken through the radials A through E of Fig. IV.

Fig. VI shows a typical hone or lap embodying some of the principles of this invention.

Fig. VI-A is an end view of the element shown in Fig. VI.

Fig. VII illustrates the hone or lap after it has approached the workpiece and is about to be rotated helically into it.

Fig. VIII shows the relative positions of the hone, or lap, and workpiece at the completion of the working cycle, but before withdrawal.

Fig. IX shows another stage of Fig. VII wherein the threads on the hone or lap are approximately worn out and are still useable and capable of producing satisfactory raceways even in cups of extremely small diameters.

Fig. X is an end view of Fig. IX showing the vertical axial relationship of a worn-out abrading member and workpiece.

Fig. XI is a comparable end view of Fig. VII, but showing a relatively unworn abrading member.

In the subject invention, the workpiece is rotated on its own axis by any suitable means, such as a chuck, collet, or by centerless means such as is partially shown in Figs. I, II, and III. Fig. II most clearly shows how the workpiece 1, is suspended between the centerless disks 2, 3, and 4, all of which are driven at the same peripheral speeds to impart a maximum of torque potential to the workpiece with a minimum of radial pressure therebetween. The upper disk 2, in particular, possesses side flanges which serve to axially position the workpiece. Under some circumstances it may be desirable for each of the disks to incorporate similar flanges but usually a single flanged disk will suffice. The abrading element, which for sake of brevity shall hereinafter be referred to as the hone, is a helically-threaded cylinder (typically illustrated in Fig. VI) mounted on a rotatable spindle 6, which is in turn carried on any suitable carriage or other means to afford its withdrawal generally axially away from the workpiece to facilitate loading and unloading the workpiece, from between the disks, after they have been separated from the workpiece. Referring to Fig. I-A, the spindle 6 is slidably disposed within a ball 11 which is secured between jaws 12 of a slide 13. The ball may be adjusted to any angle for angularly positioning the spindle 16, after which it is clamped in position by the jaws 12 when the clamping screws 14 are tightened. The slide 13 is moved horizontally by the lead screw 15. A hand wheel 16 on the end of the spindle 6 is operated to rotate the spindle which, when the thread of the hone is engaged with the groove of the workpiece, will cause the spindle to move axially within the ball 7 as the thread advances through the workpiece. A hand wheel 17 at the right-hand end of the machine operates a lead screw for moving the slide and therefore the honing tool toward and away from the work while the hand wheel 18 operates the lead screw for adjusting the slide laterally across the machine. By the operation of the lead screw 15, the hand wheels 17 and 18, the honing tool may be located at any position relative to the workpiece, and through the manipulation of the ball 11, the axis of the spindle may be diposed at an angle to the axis of the workpiece in an amount desired.

The axes of the spindle 6 and that of the hone mounted thereon are disposed in a horizontal plane $x$—$x$ parallel to the axial plane of the workpiece $y$—$y$. The planes of the vertical axes of the hone and workpiece, however, are crossed with respect to one another in such a manner that the vertical line of their intersection lies wholly within the vertical plane of the workpiece groove.

Fig. III shows the disposition, just described, of the vertical plane of the hone axis $x'$—$x'$ with respect to the vertical plane of the workpiece axis $y'$—$y'$. Their common line of intersection occurs through the point $o$, which also represents a point in the vertical plane of the workpiece groove to be finished by this method. Fig. III also shows the hone partially through the workpiece.

The hone 5 is keyed to rotate with the spindle 6 by means of dog plate 7 which also serves to tie the former two members axially together. Thus, it is apparent that if the spindle 6, and consequently the hone 5, were rotated in the direction $b$, the hone will be caused to screw itself through the workpiece, carrying the spindle 6 axially with it; no other "lead-screw" being needed once physical contact between the hone thread and the workpiece groove has been established.

Referring to Fig. II it will be seen that any means, (of which there are many suitable) by which the horizontal axis $x$—$x$ of the spindle and hone may be adjusted upwardly, will bring the hone thread into contact with the workpiece groove. If force is supplied with this adjustment, any degree of pressure desired may be obtained in their contact area, and the upper centerless disk 2 will affect an equal but reacting pressure upon the outer peripheral surface of the workpiece.

If the centerless disks 2, 3, and 4 are collectively driven in the directions indicated by their respective arrows, the workpiece 1 will be caused to rotate in a counter-clockwise direction upon its own axis. Although it would be permissible to slowly rotate the hone in a clockwise direction $b$ through the rotating workpiece, it is preferable to use an oscillatory rotation in which the degrees of rotation, in direction $a$, are less than and alternate with the degrees of rotation in direction $b$. Thus, the hone is caused to progressively proceed in an axial direction through the workpiece until the end of the thread on the hone finally contacts the workpiece groove in the vicinity of point $o$. Thereupon, rotation of the hone is prolonged in direction $a$ until the hone thread has completely screwed itself out of the workpiece.

Spindle 6 is freely floatable axially, and its only motivating force, during its inward and outward phases of the operating cycle, is furnished by the "lead-screw" effect of the hone thread when in contact with the groove of the workpiece. However, it may be advantageous, particularly in automatic adaptations of the principles of this invention, to provide a partial lead-screw or cam arrangement to "lead" the axial movement of the spindle for the first full turn upon entering (and the last full turn upon withdrawing) the hone into (and from) the workpiece. Means for performing this "lead-in-and-out" function are not shown as they would not, if used in simple form, require invention.

While it is obvious that the maximum outside diameter of the hone used may be greater than that of any grinding wheel which might possibly enter the workpiece bore, it is nevertheless true that the aforesaid diameter cannot be greater than one-half the diameter of the groove plus one-half the diameter of the bore of the workpiece. This diameter, however, is that of a helix, the peripheral length of which is always greater than the circumference of a circle of equal diameter.

The principal advantage in the use of a helically-formed abrading member for finishing a circular groove, such as shown in Fig. IV resides in the considerable effective circumferential arc of contact obtainable between the hone and the groove of the workpiece. Line $h$ therein represents the vertical plane through $o$ and the transverse center of the work groove; the two outward points $1_a$ thereon, when projected to the circular view, lie on the pitch circle of the workpiece groove $1_a$ and the line $y$—$y$. The line $j$ represents the helix center of the hone thread 5; and the points $5_a$ at its extremities, when projected to the circular view, lie on the pitch circle of the hone thread $5_a$ and on line $x$—$x$. For the sake of convenience, these two pitch circles or any point thereon are hereinafter referred to as $1_a$ or $5_a$, respectively.

It is readily admitted that if the hone and workpiece bore were plain cylinders (having length), contact between the outer surface of the former and the inner surface of the latter could occur on only a single line when they are disposed on axes parallel ($x$—$x$ and $y$—$y$) and common ($y'$—$y'$). Similarly, they could touch at only two points if they were disposed on axes parallel ($x$—$x$ and $y$—$y$) and crossed ($x'$—$x'$ and $y'$—$y'$). On the other hand, if they were only circles (without length), they could then in either instance, contact only at a single point as exemplified at $o$ or $1_a$ and $5_a$ in Fig. V-C. However the proposition here involved includes a multiplicity of simple curves; there is the skew curvature of the hone, about which is generated the transverse thread contour; and the pitch circle of the workpiece about which is generated the transverse curvature of the groove thereof.

When analysis is made of the composite effect of these simple curves upon one another we find that the normal pitch points, $1_a$ and $5_a$ respectively, behave no differently than is described in the case of the plain circles above. However, the actual points or zones of conjugation between the surfaces of the hone thread and the workpiece groove (Figs. V-A thru E) depict, in amplified manner, how the procession of contact is evolved through the radial sections A thru E of Fig. IV; in comparison with the normal relative positions of pitch points $1_a$ and $5_a$.

That the progress of the hone thread across the groove appears to occur in a rocking manner is accounted for by the fact that the angle of inclination, of the hone axis to that of the workpiece, is the angle $e$ in their vertical planes, and zero in their horizontal planes. Their effective angle of inclination through any of the intermediate radial sections may be computed by multiplying angle $e$ by the natural sine of the degrees of arc from the radial concerned, to the point $o$. The cross-sectional contour of the hone thread on the radial of conjugation C conforms generally to that of the workpiece groove. On any other radial, the thread would appear somewhat ellipsoidal because of the helical character of the thread.

The arc from the point of initial contact between the hone and workpiece (as at A) to the point of final contact (as at E) is appreciable. This is an important factor, for if circumferential waviness in the workpiece is to be removed, it is essential that the arc of contact be greater than that of any single wave. For just such a reason is the bed of a "jointer-plane" considerably greater in length than is the bed of the so-called "smooth-plane," in the parlance of the woodworker.

The medial centers of contact of the hone and workpiece are represented by the circular dots on the curves in Figs. V-A thru E. Likewise, in Fig. IV, the circumferential relationship of these same dots are shown. These medials, if simultaneously taken throughout the entire arc of contact, would describe a curve of inflexion such as shown by $k$, the point of inflexion being $o$. Areal contact, superposed about the curve $k$, and as suggestively outlined by $m$, concurrently exists between the workpiece groove and the hone thread; the size and shape thereof being effected by the characteristics of the contributing curves, and the angle $e$ of inclination.

The angle at which inclination $e$ produces maximum length, or arc of coverage by the curve of inflexion, is normally that of the helix angle of the hone thread. The functional cotangent of angle $e$ is found by dividing the product of pi and the pitch diameter of the hone thread by its lead, as hereinafter shown.

Fig. VI illustrates a typical hone or lap used in this invention. It may be entirely composed of any metallic or non-metallic material which is suitable as a lap; these may range from such as iron, copper-alloy, or aluminum in the metals; to "micarta," ceramics, "Bakelite," or wood in the non-metals. A preferred composition is that of a so-called bonded-abrasive in which an abrasive material, such as silicon-carbide, or aluminous-oxide is combined with vitreous or organic bonding materials, or diamond (bort) bonded with sinterable materials. Another form may be a combination of a metallic hub 9 upon which is formed or mounted an abrasive thread.

Aside from the advantages derived from their increased cutting ability, when used in a hone of the type shown, bonded abrasives also make possible the advantage of varying the nature of the successive threads of the hone so as to best suit the changing characteristics of the workpiece as they occur in the various stages of the honing operation. For example, the first thread $t_1$ may consist of coarse grit, hard-bonded so as to quickly and roughly remove material from the workpiece groove and correct the major errors therein. The following threads $t_2$, $t_3$, etc. may be composed of successively finer, and consequently more densely compacted abrasive, which will further correct dimensions and refine the finish of the part; or additionally, the final thread or two may be composed of types of abrasives having cork, felt or other such means for resilience to impart an extremely high lustre upon the workpiece surface. When the thread sections are composed of varying types of heterologous-bonding materials, they may be butted or cemented together to form an appreciably elongated screw form or hone, to a length of any practical value.

Although the initial pitch diameter $f'$ and thread contour $r'$ of a new or unused hone may be uniform throughout the entire length of the hone (Fig. VI), it is obvious that as the use of the hone proceeds, and wear thereof occurs, the pitch diameter will wear slightly tapered from one end to the other of the hone. This is occasioned by the fact that the leading-end of such a hone thread would be caused to contact a raceway having a pitch diameter and groove contour smaller than those of a finish-honed workpiece. The hone would therefore ultimately assume dimensions for $f$ and $r$ generally conforming to those required for an unhoned workpiece, whereas dimensions $f'$ and $r'$ would conform to those required for a honed workpiece. The ultimate diametric difference between $f'$ and $f$ would represent the diametric change of the workpiece, while the difference between $r'$ and $r$ would represent the contour change in the workpiece groove, as a result of the honing operation having removed material from the work part.

This "conditioning" of the new hone to accommodate the dimensions of the unhoned and honed workpieces is readily accomplished by partially honing a number of workpieces in succession and gradually adjusting the hone axis toward the work axis until that point of wear of the hone is reached where the entire length of the hone thread exerts a working effort on the part. The hone will then be found to have substantially the same contact pressure upon the work throughout the honing cycle and the rearward end of the hone threads will appear to be "seated." The partially-honed parts then randomly can be re-run through the machine to complete the honing operation on them.

When once the hone thread is "seated" to suit the circumstances encountered in the various stages of its operation on the workpiece, wear of the hone will not affect the relationship of $f$ to $f'$, or $r$ to $r'$, unless the relationship of the honed and unhoned groove shall have changed. Even then, the latter threads of the hone will remain dimensionally stable because the leading ones will bear the brunt of greater-than-normal stock removal or excessive deformity in the workpiece.

This invention is largely based upon the principle of distribution of error. The great improbability that successive workpieces might be identically deformed in the prior machining operation thereon, and the fact that the hone possesses great dimensional stability against the effects of such workpiece deformation as may usually be encountered, indicates the ability of this method of honing to correct nominal errors in the work part. This dimensional stability of the hone may be explained in the following manner: It will be noted that the peripheral length of the hone thread is many times greater than the periphery of the workpiece groove. Ordinarily, volumetric wear of properly-applied abrasives is many times less than the volume of work material removed. Assuming the peripheral length of the hone thread to be five times that of the workpiece groove, and the volumetric ratio of stock removal to abrasive wear to be only six to one (which is exceedingly conservative), then the aggregate dimensional change in the hone, due to wear, would be only $1/30$ the dimensional change in the workpiece as a result of honing.

Actual tests have shown the dimensional stability of the hone far exceeds the proportions given in the above assumption, and have thus demonstrated that the transference of error in the workpiece, to deform the hone, is of very small order in reality.

Fig. VII shows the disposition of the hone after it has been non-rotatively axially advanced to its work position and is ready to enter the workpiece. Rotation of the hone, in direction $b$ in conjunction with a single-turn leadscrew, brings the first thread of the hone into contact with the groove of the workpiece.

Thereafter, oscillatory rotation of the hone, as above described, causes the hone to axially advance in progression through the workpiece until the last hone thread is reached, as shown in Fig. VIII. The hone is then continuously rotated in direction $a$, resulting in the hone thread "leading" the hone axially backward out of the workpiece. As the leftward end of the hone thread again contacts the workpiece, the single-turn leadscrew brings the hone fully out of the workpiece to the position shown in Fig. IX, whereupon the hone is drawn axially away from the workpiece to facilitate removal of the latter from the machine.

When hone threads are composed of abrasive materials which have the advantage of rapid cutting ability but the disadvantage of wearing down in the process, diminution of the hone's diameter results. Compensation for this wear is obtained by adjusting the hone axis $x$—$x$ upwardly away from the workpiece axes $y$—$y$. In Fig. XI, $g$ represents the relation of these axes when the hone is new; in Fig. X, $g'$ similarly shows the relation of these same axes after the hone has become considerably worn. Therefore, if diameter $f$ (Fig. VI) of the new hone minus diameter $f''$ (Fig. IX) of the worn hone represents the diametric wear of the hone, then:

$$\frac{f-f''}{2}=g'-g=\text{total amount of compensation for wear, or wear height of the hone thread}$$

It has been hereinbefore stated that the maximum arc of contact between the workpiece and hone is achieved when the angle of inclination $e$ is that of the helix angle of the hone thread. The latter, being of constant lead throughout its wear life, obtains an increase in its helix angle as its diameter diminishes. In instances of large diameter workpieces, where the wearable height of the hone thread is but a small portion of the initial hone diameter, this increase in helix angle usually has only insignificant effect on the arc of contact. However, where small-diameter parts are to be honed, and it is desired that the wear height of the hone thread be maximum, it may be advisable to increase the setting of angle $e$, as the diameter of the hone decreases, in order to maintain a sufficient arc of contact to efficiently remove annular waviness from the workpiece.

Fig. IX shows angular inclination $e'$ which was increased to compensate for the hone having worn down to pitch diameter $f''$. Adjustment to this new angle of inclination could very readily be combined, by cam or screw means, to occur simultaneously with the adjustment for hone wear. Their adjustments may be computed in the following manner:

To determine helix angle:
(Of new hone, Fig. VII)

$$\cot e = \frac{\pi f}{P}$$

(Of worn hone, Fig. IX):

$$\cot e' = \frac{\pi f''}{P}$$

Since:

$$\frac{f-f''}{2}=g'-g$$

And, $$\frac{\pi}{P}(f-f'')=2\frac{\pi}{P}(g'-g)=\cot e - \cot e'$$

Then $$\cot e' = \cot e - \frac{6.2832}{P}(g'-g)$$

Within the range of angles ordinarily encountered for and $e'$ (5° to 10°) in the application of the principles of this invention, the graphical curve of natural function cotangents is substantially a straight line. Simultaneous adjustment for hone $(g'-g)$ and angular change for $e$ could therefore be practically applied as proportional according to the last equation above given.

Adjustment of the hone to compensate for its wear and/or for changing its axial inclination need not be done during its operation on the workpiece. I have found that the dimensional taper of the hone, after it has been properly conditioned and thereafter properly used satisfies every requirement for such "in-feeding" as may be required during the operation. Hence, as the work-size is enlarged by the hone, it is subjected to the larger dimensions of the hone by virtue of the taper and the axial movement of the latter. A very minute and definite adjustment of the axial spacing $g$, after the honing of each piece, has been found a most satisfactory manner for producing workpieces having extreme dimensional accuracy and uniformity of surface finish.

What is claimed is:

1. A honing tool comprising a cylindrical body having a helical thread extending outwardly thereof made of abrading material, the outer face of said thread being disposed on the arc of a circle having a diameter greater than the width of the thread root.

2. A polishing tool comprising a cylindrical body having a helical thread extending outwardly thereof made of polishing material, the outer face of said thread being disposed on the arc of a circle having a diameter greater than the width of the thread.

3. A honing tool comprising a cylindrical body, a helical thread on said body made of abrading material at its forward end which varies in coarseness from its forward end to its rearward end, and a polishing thread portion made of metal at the rear end of the tool.

4. The method of honing an annular groove of arcuate cross section in the interior of a cylindrical workpiece, which includes the steps of rotating the workpiece, of moving a rigid abrading helical thread having an arcuate crown into engagement with the surface of the groove, of screwing the thread through the workpiece with the axis of the thread slightly offset from and disposed at an angle to the axis of the workpiece to provide area of contact between the arcuate crown of the thread and the arcuate cross section of the groove surface.

5. The method of honing an annular groove in the interior of a cylindrical workpiece, which includes the steps of rotating the workpiece, of moving a helical thread capable of performing an abrading operation into engagement with the surface of the groove with the axis of the thread and groove substantially aligned, of screwing the thread through the workpiece by oscillating the thread about its axis a greater amount in advancing direction than in retracting direction.

6. The method of honing an annular groove of arcuate cross section in the interior of a cylindrical workpiece, which includes the steps of rotating the workpiece, of moving a rigid abrading helical thread into engagement with the surface of the groove, of screwing the thread through the workpiece by oscillating the thread about its axis a greater amount in advancing direction than in retracting direction, and of mounting the thread with its axis slightly offset from and in crossed relation to the axis of the workpiece.

7. The method of honing an annular groove in the interior of a cylindrical workpiece, which includes the steps of rotating the workpiece, of moving a honing tool having a helical thread into engagement with the surface of the groove, of screwing the thread through the workpiece with the axis of the thread offset slightly from and disposed at an angle to the axis of the workpiece to provide area of contact between the thread and groove surfaces, and of procuring the advancement of the thread through the workpiece as it is rotated solely through the engagement of the thread with the groove thereof being machined.

8. The method of honing the inner annular grooves of a plurality of workpieces, which includes the steps of rotating a thread of abrading material in the annular grooves in a plurality of the workpieces to partially hone the workpieces while shaping the working surface of the thread to the form of the groove, and of thereafter finish honing the rough honed grooves in the said workpieces after the forming operation on the working surface of the said thread has been completed by repeating the said first step.

9. The method of honing an annular groove in the interior of a cylindrical workpiece, which includes the steps of rotating the workpiece, of moving the helical thread of a tool into engagement with the surface of the groove, of screwing the thread through the workpiece with the axis of the thread disposed at an angle to the axis of the workpiece to provide area of contact between the thread and groove surfaces, of feeding the thread toward the groove to compensate for the wear of the thread, and of increasing the crossed axis angle to compensate for the decrease in the thread diameter.

10. A device for honing an internal groove in a workpiece which includes, driving means for supporting and rotating the workpiece, an abrading thread, means for advancing the thread through the workpiece while in engagement with the surface of the groove, means for adjusting the axis of the thread to be in crossed relation to that of the workpiece within the plane of the groove for producing area contact between the thread surface and that of the groove, means for mounting said thread for free axial advancement which is produced through the engagement of the thread with the groove as the thread is rotated, and means for relatively moving said thread laterally into engagement with a groove of the workpiece as wear occurs on the thread.

11. A device for honing an internal groove in a workpiece which includes, driving means for supporting and rotating the workpiece, an abrading thread, means for advancing the thread through the workpiece while in engagement with the surface of the groove, means for adjusting the axis of the thread to be in crossed relation to that of the workpiece within the plane of the groove for producing area contact between the thread surface and that of the groove, means for mounting said thread for free axial advancement which is produced through the engagement of the thread with the groove as the thread is rotated, means for relatively moving said thread laterally into engagement with a groove of the workpiece as wear occurs on the thread, and means for increasing the crossed axis relation between the axes of the thread and workpiece as the thread decreases in diameter as it wears.

JOHN E. KLINE.

REFERENCES CITED

The following references are of record in the file of this patent:

UNITED STATES PATENTS

| Number | Name | Date |
|---|---|---|
| 872,883 | Adams | Dec. 3, 1907 |
| 1,374,334 | Sumbling | Apr. 12, 1921 |
| 1,660,811 | Perkins | Feb. 28, 1928 |
| 1,687,661 | Eaton | Oct. 16, 1928 |
| 2,003,713 | Highberg | June 4, 1935 |
| 2,198,377 | Dunbar et al. | Apr. 23, 1940 |
| 2,257,452 | Binns et al. | Sept. 30, 1941 |
| 2,397,463 | Boeck et al. | Apr. 2, 1946 |
| 2,398,660 | Michelsen et al. | Apr. 16, 1946 |

FOREIGN PATENTS

| Number | Country | Date |
|---|---|---|
| 355,769 | Great Britain | Feb. 24, 1930 |
| 552,625 | Great Britain | Apr. 16, 1943 |